S. Avery.
Corn Planter.
№ 29,046.  Patented Jul. 10, 1860.
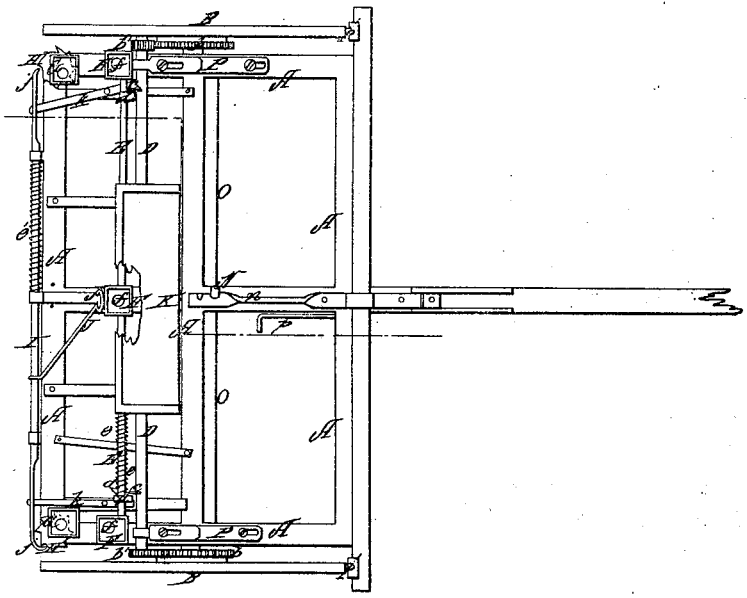
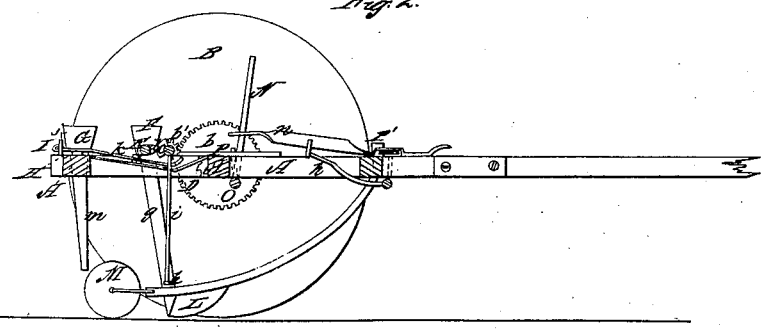

UNITED STATES PATENT OFFICE.

SAMUEL AVERY, OF PISGAH, MISSOURI.

IMPROVEMENT IN CORN-PLANTERS.

Specification forming part of Letters Patent No. 29,046, dated July 10, 1860.

*To all whom it may concern:*

Be it known that I, SAMUEL AVERY, of Pisgah, in the county of Cooper and State of Missouri, have invented a new and Improved Corn-Planter; and I do hereby declare that the following is a full, clear, and exact description of the same, reference being had to the accompanying drawings, making a part of this specification, in which—

Figure 1 is a plan or top view of my invention. Fig. 2 is a longitudinal vertical section of the same, taken in the line $x$ $x$, Fig. 1.

Similar letters of reference indicate corresponding parts in both figures.

This invention relates to that class of corn-planters which are designed for planting the corn in hills at regular intervals apart; and it has for its object the obviating of the labor and expense of laying out the ground previous to the planting operation. A wheel cannot well be moved across a large field twice in succession in two places, owing to the unevenness of the ground, and for this reason those machines whose spacing-off or check-rowing devices are connected with the driving-wheels cannot work perfectly unless some means be provided whereby the driver can regulate the machine while it is in motion. To obviate these difficulties my invention consists in a peculiar arrangement of gear-wheels operated by means of driving-wheels which support the machine, and connected with a shaft that transmits motion to the various parts of the machine. These gear-wheels serve to regulate the two driving-wheels, so that each shall make exactly the same number of revolutions in a given time, thus obviating side draft, which is likely to occur when obstructions come in the way of the wheels, and they are so arranged that they can be thrown into and out of gear at the pleasure of the operator; and it consists in the application of brakes to the driving-wheels in such a manner as to control their revolutions when passing over uneven ground, so that they may be held in operative condition, but prevented from giving motion to the gear-wheels until the proper time; and it consists in the arrangement of boxes for holding lime or other white substance, mounted on each side of the rear part of the frame, and having a ratchet-wheel placed under their bottoms. Both the ratchet-wheel and the bottom of the box have a hole made through them, which holes are caused to register at a certain number of revolutions of the main shaft, all arranged and combined as hereinafter described and represented.

To enable those skilled in the art to fully understand my invention, I will proceed to describe its construction and operation with reference to the drawings.

A represents the frame of the machine, which is mounted on two wheels, B B. These wheels B B are fitted loosely on axles projecting from each end of the frame A.

On the inner end of the hub of each wheel B there is secured a cog-wheel, $b$, which gears with a smaller wheel, $b'$, on the end of the shaft D, said gearing giving a rotary motion to this shaft D.

Near each end of the shaft D a cam, $c$, is secured, which, in the motion of the shaft D, strikes against a projection, $d$, on the bar E, giving to said bar a longitudinal thrust. The bar E is provided with a spiral spring, $e$, which is coiled around it in such a manner that it causes the bar to fly back to its original position after being acted upon by the cam $c$. Each end of this bar E is provided with a seed-slide, which works under the hoppers, so as to regulate the discharge of seed.

F F F are three hoppers having their bottoms perforated with seed-cells $f$. These hoppers are mounted on the longitudinal beams of the frame A, just behind the main shaft D. To the under side of each hopper F there is secured a tube, $g$, for conducting the kernels to the ground, and near the lower end of each tube there is a valve, $h$, operated by means of a metal strip, $i$, one end of which is secured to the bar E. This valve serves to contain the quantity of one discharge until it is opened by means of the cam $c$ striking against the projection on the bar E, when the kernels drop to the ground without being scattered, which would not be the case if they fell direct from the hoppers.

G G are two lime-boxes mounted on the back part of the frame A, and having perforations in their bottoms. Under each box G there is placed a ratchet-wheel, H, having eight teeth, and operated by means of a pawl, $j$, on the end of a slide-bar, I, said bar being operated by means of levers $k$, upon which the cams $c$ act. Each ratchet-wheel H has a hole made through it, which hole at every eighth revolution of the main shaft D, and consequently at every eighth discharge of the seed from the hoppers F, is brought to register with the hole in the bottom of the box G, thus allowing a jet of lime or other white substance to pass down through the tube m to the ground. The lime thus deposited serves as guide-marks to enable the driver to regulate his machine so that it shall discharge the corn at the proper time to make the rows even and equidistant from each other. The bar I is also provided with a spiral spring, e, which causes it to be thrown back after the operation of the cam c on the lever k; and it is also provided with a hand-rod, J, which projects up just behind the driver's seat K, so that by taking hold of it with his hand he can adjust the ratchet-wheel, after turning the machine, so that its registering with the hole in the bottom of the lime-box shall exactly correspond to deposits of lime already made.

L L L are the shoes for making the drills in which the corn is to be planted. These shoes are placed directly in front of the seed-tubes g, and they are attached to the lower ends of rods that are hinged to the forward part of frame A. They are thus capable of a free upward and downward motion, and will conform to any unevenness of ground.

To the shoes L, and just behind the tubes g, are attached the covering-rollers M, which serve to press the earth over the deposited corn.

N is a hand-lever, which serves to operate a bar, O, passing transversely under the frame, and bent so as to pass up through slots made in the side longitudinal beams of the frame A. On the ends of this bar, and on the side beams, slides P are fitted, which are operated by the hand-lever N in such a manner as to throw the cog-wheels b and b' into and out of gear, so that the machine may be readily turned, after having made its transit across the field, without deranging the other parts. A spring-bar, n, having notches cut in its edge, (see Fig. 1,) serves to hold the lever N in the desired position.

The wheels B B are provided with brakes P', which are operated by means of a foot-lever, p. These brakes serve to enable the driver to regulate the motion of the driving-wheels B when passing over the ground.

The operation is as follows: As the machine is drawn along, the wheels B B give motion to the gearing b b', and consequently a rotary motion to the shaft D. The cams c on the said shaft strike once during every revolution against the projections d on the bar E, causing the perforations in the plates on the ends of said bar E to register with the holes in the bottoms of the hoppers F, and thereby permitting the charges of seed to enter the tubes g; but simultaneously with the registering of the said perforations the valves h are opened, so that the charges previously caught by said valves are permitted to fall to the ground, when the valves immediately close, so as to catch the descending charges. The seed thus released by the valves h falls in a mass in the trench made by the shoes L and is planted by the rollers M. The cams c, immediately after acting on the projections d, come in contact with the levers k, causing said levers to give a longitudinal thrust to the bar I, which causes the pawls j to act upon the teeth of the ratchet-wheels H, moving them the distance round of one tooth, and thereby permitting the deposit of lime at every eighth revolution of the cams. The deposit of this lime is an important feature, for by observing it the driver is enabled to regulate the whole machine, as it is evident that if the lime deposits are in lines equidistant from and parallel with each other the hills planted must also be in even and straight lines, which fact greatly facilitates the subsequent plowing and cultivation of the corn-plants.

Having thus fully described my invention, what I claim as new, and desire to secure by Letters Patent, is—

1. The main shaft D, operated by gearing b b', connected with the driving-wheels B B, and the brakes P for regulating the motion of said driving-wheels, so that the same shall rotate alike and be under the control of the operator, as and for the purposes set forth.

2. The lime-boxes G, mounted on the frame A, and provided with ratchet-wheels H, said ratchet-wheels being operated by means of pawls j on each end of a slide-bar, I, said slide-bar receiving its motion from the main shaft D by means of the cams c, acting on the lever k, all arranged and operating substantially as herein shown and described.

SAMUEL AVERY.

Witnesses:
CALVIN GEORGE,
JOHN L. JONES.